US007327229B1

(12) United States Patent
Nichols et al.

(10) Patent No.: US 7,327,229 B1
(45) Date of Patent: Feb. 5, 2008

(54) PROACTIVE ANTI-THEFT SYSTEM AND METHOD

(76) Inventors: Gerald H. Nichols, 8555 S. Lewis, #164, Tulsa, OK (US) 74137; Sanford G. Fitzgerald, 2937 W. 53rd, Tulsa, OK (US) 74107

( * ) Notice: Subject to any disclaimer, the term of this patent is extended or adjusted under 35 U.S.C. 154(b) by 0 days.

(21) Appl. No.: 11/542,099

(22) Filed: Oct. 3, 2006

Related U.S. Application Data

(60) Provisional application No. 60/757,972, filed on Jan. 11, 2006.

(51) Int. Cl.
    *B60R 25/10* (2006.01)
(52) U.S. Cl. .............................. 340/426.1; 340/426.16; 340/426.18
(58) Field of Classification Search ............. 340/426.1, 340/426.16, 426.18, 426.2; 379/45; 455/404.1
    See application file for complete search history.

(56) References Cited

U.S. PATENT DOCUMENTS

| 5,223,844 | A |   | 6/1993 | Mansell et al. |
|-----------|---|---|--------|----------------|
| 5,339,351 | A | * | 8/1994 | Hoskinson et al. ............ 379/45 |
| 5,370,201 | A | * | 12/1994 | Inubushi ................ 340/426.12 |
| 5,515,043 | A |   | 5/1996 | Berard et al. |
| 5,629,693 | A |   | 5/1997 | Janky |
| 5,673,305 | A | * | 9/1997 | Ross ...................... 340/426.16 |
| 5,717,379 | A | * | 2/1998 | Peters ..................... 340/539.25 |
| 5,874,889 | A | * | 2/1999 | Higdon et al. ......... 340/426.36 |
| 5,898,391 | A |   | 4/1999 | Jefferies et al. |
| 5,933,080 | A | * | 8/1999 | Nojima ................... 340/426.19 |
| 5,939,975 | A | * | 8/1999 | Tsuria et al. ............ 340/426.18 |
| 6,046,687 | A |   | 4/2000 | Janky |
| 6,184,801 | B1 |   | 2/2001 | Janky |
| 6,240,365 | B1 |   | 5/2001 | Bunn |
| 6,310,543 | B1 | * | 10/2001 | Yoshioka et al. ........... 340/436 |
| 6,337,621 | B1 | * | 1/2002 | Ogino et al. ............. 340/425.5 |
| 6,415,210 | B2 | * | 7/2002 | Hozuka et al. ......... 340/426.16 |
| 6,442,241 | B1 | * | 8/2002 | Tsumpes ...................... 379/45 |
| 6,480,098 | B2 |   | 11/2002 | Flick |
| 6,833,785 | B2 | * | 12/2004 | Brown et al. .......... 340/426.12 |
| 6,847,892 | B2 | * | 1/2005 | Zhou et al. .............. 340/426.1 |
| 6,879,247 | B2 | * | 4/2005 | Shimomura et al. ... 340/426.18 |
| 6,947,755 | B1 | * | 9/2005 | Gould et al. ................ 455/457 |
| 6,956,467 | B1 |   | 10/2005 | Mercado, Jr. |

(Continued)

FOREIGN PATENT DOCUMENTS

GB          2374184         10/2002

OTHER PUBLICATIONS

WWW.LOJACK.COM, "Early Warning Recovery System," Website, LoJack Corporation, Apr. 11, 2006.

*Primary Examiner*—John Tweel, Jr.
(74) *Attorney, Agent, or Firm*—Gable Gotwals

(57) ABSTRACT

A proactive anti-theft system and method for a vehicle that contacts a call center and a 911 center. The call center communicates with the local police dispatch center and contacts the vehicle's owner to confirm theft or other incident involving the vehicle. The anti-theft system continues communication between the alarm system and the 911 center until the vehicle is located or the alarm system is deactivated. The call center provides the local police dispatch center with information on the vehicle. The location of the vehicle can be determined by the mobile phone transmissions sent by the alarm system. The system can also provide audio surveillance of the interior of the vehicle.

15 Claims, 3 Drawing Sheets

U.S. PATENT DOCUMENTS

| | | | |
|---|---|---|---|
| 6,975,872 B2 * | 12/2005 | Cheng | 455/456.1 |
| 7,031,714 B1 * | 4/2006 | Rayburn | 455/445 |
| 7,107,043 B2 * | 9/2006 | Aoyama | 340/426.1 |
| 7,129,838 B2 * | 10/2006 | Shimomura et al. | 340/426.1 |
| 7,145,435 B2 * | 12/2006 | Kim | 340/426.18 |
| 7,151,440 B2 * | 12/2006 | Chen et al. | 340/426.1 |
| 7,154,384 B2 * | 12/2006 | Nitou | 340/426.16 |
| 7,176,788 B2 * | 2/2007 | Park | 340/426.1 |

* cited by examiner

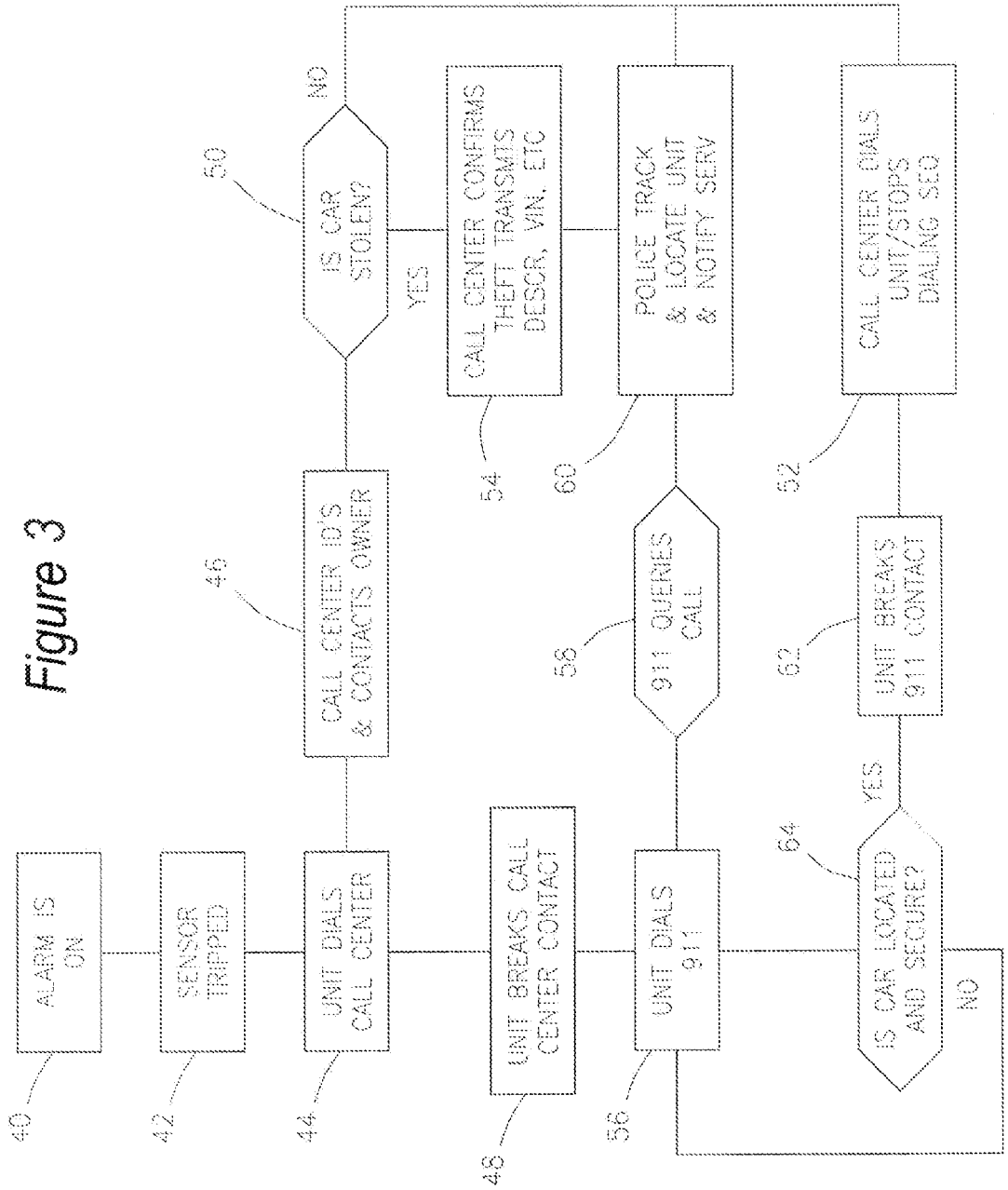

PROACTIVE ANTI-THEFT SYSTEM AND METHOD

REFERENCE TO PENDING APPLICATIONS

This application is based upon and claims priority of U.S. Provisional Patent Application 60/757,972, filed Jan. 11, 2006.

REFERENCE TO MICROFICHE APPENDIX

This application is not referenced in any microfiche appendix.

FIELD OF THE INVENTION

The present invention is generally directed toward a vehicle alarm system. More specifically, the present invention provides an alarm system and method of notifying the authorities in a timely manner while providing the location of the vehicle.

BACKGROUND OF THE INVENTION

In the United States a vehicle theft occurs every 24.7 seconds. This amounts to roughly 1.2 million vehicles stolen every year. Seventy-three percent of these vehicles are eventually recovered in one form or another. However, the remaining 324,000 vehicles are never recovered. With an average value at the time of the theft of $7,100 this leaves the insurance company with a total loss on the non-recovered vehicles of 2.3 billion dollars.

The insurance industry losses from vehicle theft are actually much higher when adding in the cost of damage done to the vehicle while breaking into it and stealing it. The losses are further increased by parts that are removed from the stolen vehicle in between the time it is stolen and when it is recovered. If the damage or parts removed from the vehicle is extensive enough a recovered vehicle can even qualify as a total loss such as those non-recovered vehicles.

Additional losses are incurred by both insurance companies and individuals when the stolen vehicles are involved in car chases as well as accidents.

As evidenced by the numbers above the costs to the U.S. insurance companies and in turn their policy holders arising from auto theft are very alarming. In addition to the monetary losses, violent crimes associated with auto theft including carjacking, rape and murder also provide a sobering loss to consider.

The police list the vehicle on a hot sheet so officers will be on the look out for the stolen vehicle. The vehicles are typically stolen and then parked in a remote location or large parking lot where they will not be noticed. This provides time for the officers to stop looking for the vehicle. Once the vehicle has "cooled off" it can be moved by the vehicle thieves with little danger of being caught by the police. If the vehicle can be recovered during this "cooling off" period, it can be returned to its owner with minimal damage.

Several vehicle manufacturers have attempted to address this problem by selling vehicles equipped with a satellite communication link coupled with GPS locating equipment. These provide a link to a call center in the event the panic button is pushed or the vehicle is involved in a collision. However, these systems depend upon satellite communication and are not made to be retrofitted to existing non-equipped vehicles. They are also not capable of contacting the local 911 centers directly from the vehicle. Therefore there is a need for a vehicle alarm system that can be retrofitted to existing vehicles.

There is also a need for a vehicle alarm system which can contact the authorities while also contacting the owner of the vehicle and notifying of the theft of their vehicle.

Further there is also a need for an alarm system which can provide the authorities with the location of the vehicle.

BRIEF SUMMARY OF THE INVENTION

The present invention satisfies the needs discussed above. The present invention provides a vehicle alarm system and method of notifying the authorities of the theft or other emergency.

The present invention provides a vehicle alarm system with sensors capable of determining when the vehicle has been broken into or has been involved in an accident as well as having the ability to recognize certain predetermined voice commands indicating an unauthorized hijacking of the vehicle. The alarm system is connected with a mobile phone which contacts a call center and the 911 center. The owner of the vehicle has previously provided the call center with relevant information, such as vehicle identification (VIN), license number, owner contact numbers and the local police dispatch telephone number. Once the alarm system has been tripped, the call center first calls the local police dispatch center and provides them with information relating to the identification VIN, license number and contact information of the vehicle involved. The call center then calls one or more numbers in order to notify the vehicle's owner of the situation and confirm that it is an unauthorized use of the vehicle. If the call center confirms with the owner that it is a false alarm the call center contacts the local police dispatch center to disregard the call from the alarm system and contacts the alarm system to deactivate the alarm.

However if the call center confirms it is an unauthorized use of the vehicle or the call center is unable to contact the owner the call center contacts the local police dispatch center and confirms that the vehicle is stolen. The 911 center has the vehicle location as provided by the alarm system and advises the local police dispatch center of the vehicle location.

Once activated the alarm system and mobile phone continuously contacts the 911 center every 60 seconds or for a predetermined length of time until the vehicle is secured. This allows the location of the vehicle to be updated. The alarm system and mobile phone can also provide the 911 center with audio surveillance of the interior of the vehicle during these phone calls.

Further objects and features of the present invention will be apparent to those skilled in the art upon reference to the accompanying drawings and upon reading the following description of the preferred embodiments.

BRIEF DESCRIPTION OF THE DRAWINGS

FIG. 3 is a flow diagram of one embodiment of the present invention.

DETAILED DESCRIPTION OF THE INVENTION

For explaining the present invention in detail it is to be understood that the invention is not limited in its application to the details of the construction and arrangement of the parts illustrated in the accompanying drawings. The invention is capable of other embodiments and of being practiced or carried out in a variety of ways. It is to be understood that the phraseology and terminology employed herein are for the purpose of description and not of limitation.

Figure 1:
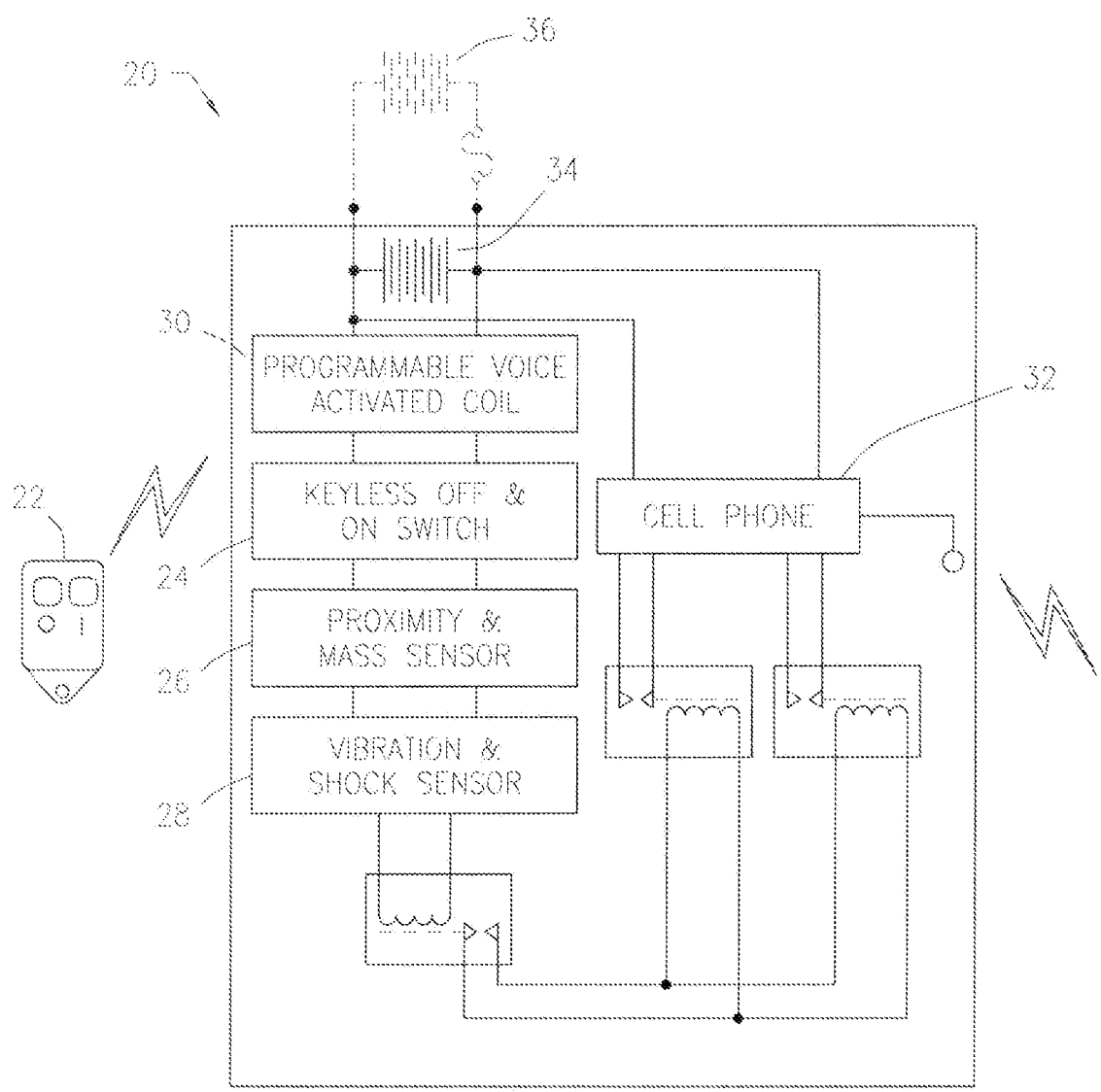
FIG. 1 is a circuit diagram of the onboard portion of one embodiment of the present invention.

The on board portion of the alarm system 20 of the present invention is located in the vehicle. The alarm 20 is activated using a wireless remote 22 which activates a keyless on/off switch 24. The alarm 20 can also be activated by operating the vehicle. The alarm system 20 has one or more sensors. Various types of sensors can be used. FIG. 1 shows a proximity and mass sensor 26 capable of sensing an individual attempting an unauthorized entry of the vehicle. A vibration and shock sensor 28 is capable of sensing an unauthorized entry into the vehicle or unauthorized movement of the vehicle as well as determining whether the vehicle has been involved in an accident.

The alarm system 20 can also include a programmable voice activated coil 30. The coil 30 can be preprogrammed to respond to panic words such as stop, help, quit, police, etc. The alarm system 20 is coupled to a mobile phone 32.

The alarm system 20 and mobile phone 32 operate off of a primary battery 34. The alarm system 20 can also be equipped with an auxiliary battery 36 that can provide power for the alarm system 20 and mobile phone 32 in the event the primary battery 34 is disabled. The auxiliary battery 36 would preferably be in a concealed location such that an individual stealing the vehicle would not readily locate it.

Figure 2:
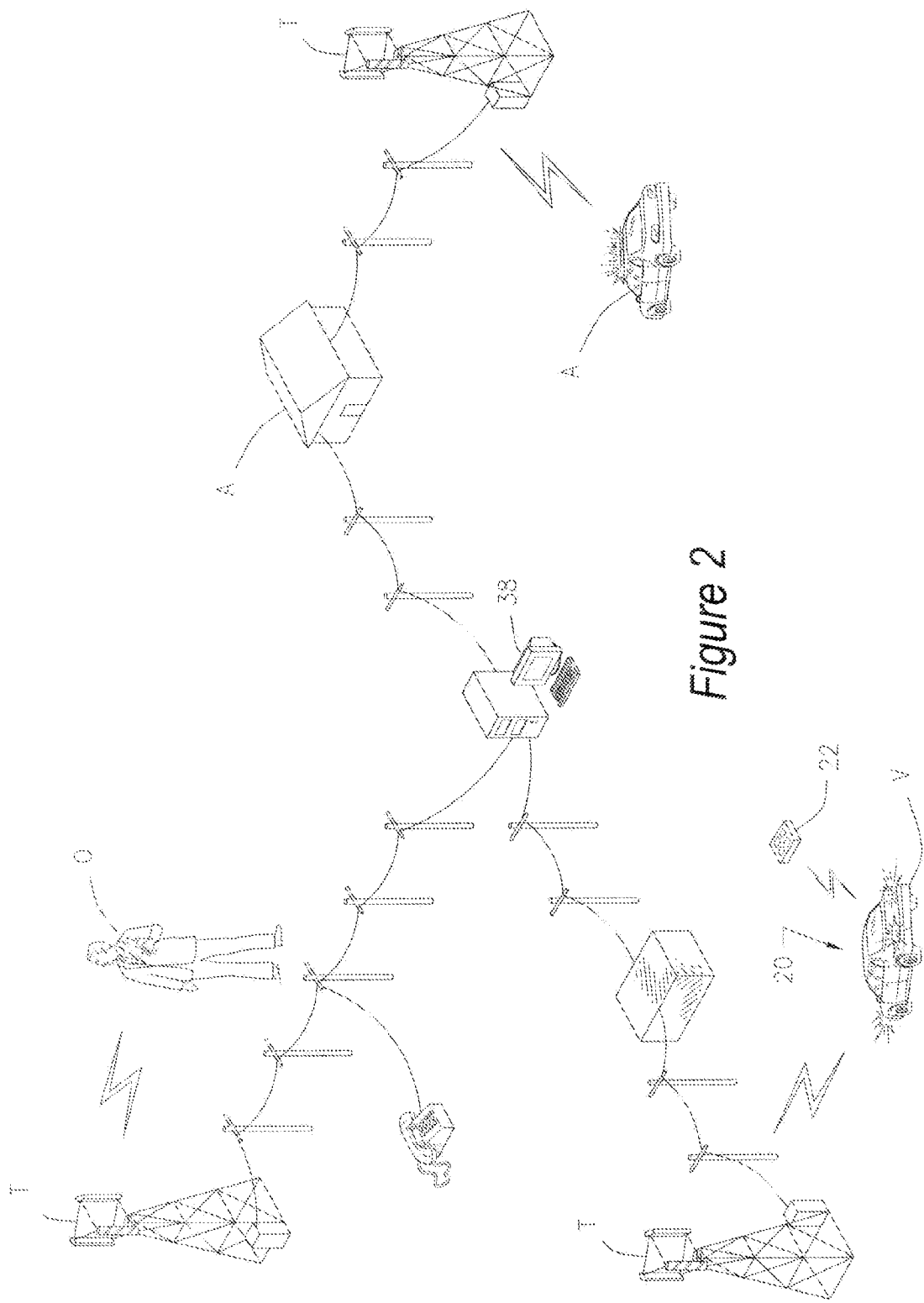
FIG. 2 provides a schematic drawing of the system used for the present invention.

Referring to FIG. 2, the present invention of an alarm system and method of notifying the authorities of a stolen vehicle or other crime utilizes an alarm system 20 located in a vehicle. The alarm system 20 is coupled with a mobile phone 32. The mobile phone 32 is used to contact a call center 38 as well as the authorities A which in turn notifies the owner O and locates the vehicle V utilizing the mobile phone signal.

FIG. 3 is a flow diagram of the process the alarm uses to notify the authorities. The alarm 20 is first turned on or activated 40. If one or more of the sensors are tripped 42 the alarm system 20 dials the call center 44. The call center 38 identifies the alarm system 20 calling and contacts the owner O. In the preferred embodiment one or more of the owners telephone numbers can be contacted in succession or simultaneously until an individual answers the phone and confirms whether or not the vehicle V is stolen 50. In addition to contacting the owner O via telephone, e-mail, text message or any other type of communication electronic or otherwise could also be used.

The alarm system 20 also contacts the 911 center 56. The 911 operator will query the call 58 until it is identified as a non-responsive cell phone call. The 911 operator will then dispatch a police unit to investigate it further and provide them with the caller ID information.

The call center 38 first contacts the local police dispatch center and provides them with the description, VIN, license plate number and any other pertinent information of the vehicle V. Second, the call center 38 begins contacting the owner O at the previously provided contact information numbers. If an individual is contacted at one of the owner's O contact numbers and confirms that the vehicle V has not been stolen, the call center 38 notifies the local police dispatch center it is a false alarm and deactivates the alarm 52. At this time, the local police dispatch center notifies the 911 center of the false alarm. If the call center 38 is not successful in contacting the owner O or the owner O confirms that the vehicle V has been stolen, the call center 38 confirms with the local police dispatch center that the vehicle has been stolen and requests assistance in locating the vehicle. Once assistance has been requested, the 911 center and local police dispatch center will work together in locating the stolen vehicle. The contact between the call center 38 and the local police dispatch center may remain intact as the call center 38 confirms the theft of the vehicle V with the owner O. If this contact remains intact it may be desired to be placed on hold, depending upon the call volumes and available lines at the call center 38 and local police dispatch center.

The 911 center can locate the vehicle and track it 60 by determining the vehicle's V location based on the signal generated by the mobile phone 32 in conjunction with the alarm system 20. The location can be determined by triangulating the signal off of two or more towers T or by satellite GPS technology of available to the authorities. Once the vehicle V has been recovered the alarm system 20 is deactivated 52. If the vehicle V has still not been secured by the authorities A, the alarm system 20 continues the call to the 911 canter 56 where it provides information to the authorities 58 so that the vehicle V can be located again. The alarm system 20 continues the call to the 911 center until the vehicle V is secured. Once the vehicle V is secure the alarm system 20 breaks contact with the 911 center 62.

During the call to the 911 center 56 the alarm 20 can transmit to them audio surveillance of the interior of the vehicle so that the authorities A have a better understanding of the situation and how best to handle it. As a result the authorities may decide to take immediate action or wait for back up to stop the vehicle.

Various types of sensors can be used in the present invention including but not limited to motion sensors, vibration sensors, shock sensors, proximity sensors and voice activated coils programmed to respond to predetermined words. In the preferred embodiment the alarm system 20 would be equipped with voice activated coils 30 which are programmed to respond to certain predetermined words, such as help, police, a scream or the sound of breaking glass. It may be preferred to have alarm system 20 set up such that it will be triggered by the voice activated coils 30 even when the alarm system 20 is not activated. This would aid in situations where the operator of the vehicle has not reactivated the alarm system after entering the vehicle and the vehicle and operator are subsequently car jacked.

If the alarm system 20 is triggered by the voice activated coils 30, it would indicate a violent crime such as a car jacking, robbery, rape or assault and battery are currently being perpetrated against the owner O or other occupant of the vehicle V. In these situations it may be preferred to skip the steps of having the call center 38 attempt to contact the owner O and confirm the crime 46, 50 and 54.

The amount of time the alarm system 20 spends in contact with the 911 center can be varied as deemed necessary. Likewise the wait time between calls could also be varied.

In the preferred embodiment it is anticipated that the mobile phone 32 within the vehicle would be silent during the transmissions to the call center 38 and to the 911 center such that the perpetrator would not be aware of the operation of the alarm system 20 the telephone calls to the call center 38 or the 911 center.

If the local police dispatch center requests that the call center provide two-way communication with the vehicle, the call center will patch through to the mobile telephone located in the vehicle and the local police dispatch center can now be in contact with the perpetrator.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A process of notifying the authorities of a crime comprising:
   providing a vehicle with an alarm system having one or more sensors and a mobile phone;
   activating the alarm system;
   when the sensor is triggered the alarm system establishes a contact with a call center via the mobile phone;
   the alarm system terminates the contact with the call center and establishes a contact with a 911 center;
   the call center establishes contact with a local police dispatch center and provides relevant information;
   the call center attempts to contact an owner of the vehicle and confirm whether the vehicle has been stolen;
   if the vehicle is not stolen the call center notifies the local police dispatch center it is a false alarm and the alarm system is deactivated;
   if the vehicle is stolen or the call center fails to contact the owner, the call center confirms with local police dispatch center that a vehicle theft is in progress;
   the alarm system continues contact with the 911 center via the mobile phone until the alarm system is deactivated or the vehicle is recovered; and
   the 911 center determines a location for the vehicle based on the mobile phone contact.

2. The process of claim 1, said sensor comprising a motion sensor.

3. The process of claim 1, said sensor comprising a vibration sensor.

4. The process of claim 1, said sensor comprising a shock sensor.

5. The process of claim 1, said sensor comprising a proximity sensor.

6. The process of claim 1, said sensor comprising a voice activated coil programmed to respond to predetermined words.

7. The process of claim 1, further comprising the alarm system transmitting sound from the vehicle to the 911 center.

8. The process of claim 1, further comprising executing the routine of establishing contacts via the phone without any indication to an occupant of the vehicle.

9. The process of claim 1, further comprising deactivating the alarm system upon recovery of the vehicle.

10. The process of claim 9, further comprising the call center deactivating the alarm system via the mobile phone.

11. The process of claim 1, further comprising providing the alarm system and mobile phone with a concealed auxiliary battery.

12. The process of claim 1, further comprising activating the alarm system via a wireless remote control.

13. The process of claim 1, further comprising activating the alarm system automatically when the vehicle is operated.

14. A process of notifying the authorities of a crime comprising:
   providing a vehicle with an alarm system having one or more sensors and a mobile phone;
   activating the alarm system;
   when the sensor is triggered the alarm system establishes a contact with a call center via the mobile phone;
   the alarm system terminates the contact with the call center and establishes a contact with a 911 center;
   the call center establishes contact with a local police dispatch center and provides relevant information;
   the call center attempts to contact an owner of the vehicle and confirm whether the vehicle has been stolen;
   if the vehicle is not stolen the call center notifies the local police dispatch center it is a false alarm and the alarm system is deactivated;
   if the vehicle is stolen or the call center fails to contact the owner, the call center confirms with local police dispatch center that a vehicle theft is in progress; the alarm system continues contact with the 911 center via the mobile phone until the alarm system is deactivated or the vehicle is recovered;
   the 911 center determines a location for the vehicle based on the mobile phone contact; and
   the alarm system providing audio surveillance of an interior of the vehicle.

15. A process of notifying the authorities of a crime comprising:
   providing a vehicle with an alarm system having one or more sensors and a mobile phone, wherein one of the sensors is a voice activated coil;
   when the voice activated coil is triggered the alarm system establishes a contact with a call center via the mobile phone;
   the alarm system terminates the contact with the call center and establishes a contact with a 911 center;
   the call center establishes a contact with a local police dispatch center;
   the call center provides the local police dispatch center with information on the vehicle;
   the alarm system continues contact with the 911 center via the mobile phone until the alarm system is deactivated or the vehicle is recovered; and
   the 911 center determines a location for the vehicle based on the mobile phone contact.

* * * * *